(12) United States Patent
Small

(10) Patent No.: US 10,408,609 B1
(45) Date of Patent: Sep. 10, 2019

(54) LIGHT GUIDES FOR SENSOR ALIGNMENT

(71) Applicant: Brijot Millimeter Wave Technologies, Corp., Miami, FL (US)

(72) Inventor: Farrell Anthony Small, Sanford, FL (US)

(73) Assignee: Brijot Millimeter Wave Technologies, Corp., Miami, FL (US)

( * ) Notice: Subject to any disclaimer, the term of this patent is extended or adjusted under 35 U.S.C. 154(b) by 0 days.

(21) Appl. No.: 16/293,028

(22) Filed: Mar. 5, 2019

(51) Int. Cl.
*G01B 11/27* (2006.01)

(52) U.S. Cl.
CPC .................................. *G01B 11/272* (2013.01)

(58) Field of Classification Search
CPC ..................................................... G01B 11/272
See application file for complete search history.

(56) References Cited

U.S. PATENT DOCUMENTS

| 9,202,094 | B1 | 12/2015 | Chen et al. |
| 9,207,317 | B2 | 12/2015 | Einat et al. |
| 2004/0021912 | A1 | 2/2004 | Tecu et al. |
| 2013/0057652 | A1* | 3/2013 | Firth ....................... G01B 11/25 348/46 |
| 2014/0375335 | A1* | 12/2014 | Winso .................. G01K 11/006 324/637 |

OTHER PUBLICATIONS

BullseyeBore, Inc., BullseyeBore Home Webpage, Available at: http://www.bullseyebore.com/ (Accessed on Nov. 30, 2018), 8 pages.

* cited by examiner

*Primary Examiner* — Hina F Ayub
(74) *Attorney, Agent, or Firm* — Daylight Law, P.C.

(57) ABSTRACT

Specific devices and systems associated with aligning sensors to targets are disclosed herein. More specifically, systems that utilize light guides for aligning scanning surfaces of scanning devices with target surfaces of scan targets are disclosed herein. One disclosed device comprises a body, a sensor fixed to the body, and at least two apertures aligned with the sensor. The apertures define visible light patterns. The visible light of the visible light patterns can be generated by at least one light source that emits light through the at least two apertures. The visible light patterns exhibit a unique combined representation when projected at a target that is at the optimal front focal distance from the sensor. The visible light patterns also independently exhibit first and second universal representations when projected at a target surface that is at the optimal orientation relative to the sensor.

21 Claims, 6 Drawing Sheets

LIGHT GUIDES FOR SENSOR ALIGNMENT

BACKGROUND

Sensors are devices that sense and respond to physical phenomena. They are generally characterized by an effective range in which they can detect those phenomena. If the sensor is not properly located relative to a target, the sensor may not respond despite the existence of the phenomena the sensor is designed to respond to. Depending upon the associated design, an operator might not be able to determine the difference between a failed scan and a successful scan which produced a negative sensing result. In certain applications such as in security scanning or medical diagnostic scanning, it is crucial that these two be distinguished. In short, there is a critical difference between the statements: there is no weapon located on the target; and I was not able to scan the target because they are out of range. As such, if the device does not have a way to distinguish between these two scenarios, careful attention must be paid to the training of operators as to the proper operation of the device to assure the target is always in range when a scan is conducted. However, training personnel in the proper usage of new equipment carries its own costs and introduces another potential source of error in the form of administrative oversight and human error.

SUMMARY

Devices and methods that provide a scanning device operator with assurance that a sensor target is located within the effective range of the sensor are disclosed herein. In specific embodiments, these devices include light guides that provide an operator with a visible indication that a target is within the effective range of the scanning device. These light guides can involve the presentation of intuitive patterns to indicate that the scanning device is aligned in terms of both forward focal distance and orientation relative to the target.

Hand held scanning devices used for security purposes, such as hand-held passive millimeter wave body scanners, present a beneficial application for the devices and methods disclosed herein because they are affected by both the distance and orientation of the scanning device relative to the target. As with many other sensors, the sensor array of a hand-held passive millimeter wave body scanner should be placed orthogonal to the surface of the target in order to maximize the reception of waves emitted from the target surface and maximize the sensor's effectiveness at detecting a contrast between human tissue and an undefined object. It is also somewhat difficult to continuously align the scanning device with the numerous contours and curves of the human body. As such, operator guidance as to the orientation of a hand-held body scanner is important. Furthermore, placing the scanning device as close to the target as possible, which would be an intuitive instruction for operators to follow and implement, will not place the scanner at the optimal location. Instead, many passive millimeters wave body scanners are characterized by an optimal forward focal distance, such that the sensors in the scanning device can at times be either too close or too far from the target. The scanning device must therefore be kept at both an optimal distance and orientation relative to the target.

In specific embodiments of the invention, light guides fixed relative to the one or more sensors of a scanning device provide a visible indication to an operator regarding the optimal forward focal distance and orientation of the scanning device such that the operator can place the scanning device at the optimal position relative to the target. The light guides can include at least two light sources. The light sources can interact, when projected onto the target, such that the operator is immediately and continuously apprised as to whether the current position of the scanning devices satisfies both conditions (e.g., optimal distance and orientation). The interaction of the light sources can involve the presentation of one or more visible light patterns to the operator. The light sources can also independently convey information to the operator regarding the optimal distance or orientation. In specific embodiments, the light sources will independently convey information regarding the optimal orientation while the light sources will, in combination, convey information regarding the optimal distance. In specific embodiments, the light sources will independently convey information regarding the optimal distance while the light sources will, in combination, convey information regarding optimal orientation. For example, the orientation could be indicated by the regularity of individual elements in the pattern while the distance could be indicated by spacing between individual elements in the pattern.

The patterns can exhibit unique representations when the scanning devices is at the optimal position relative to the target so that the operator can be assured that they will only see the pattern take on that unique representation when the device is at the optimal position. For example, the patterns could involve symmetrical shapes that only appear symmetrical when the device is at the optimal orientation relative to the target surface. The symmetry could reflect the orientation of the sensor relative to the target. In situations where the optimal orientation was defined by both x-axis and y-axis alignment, the symmetry of the pattern could be along both the x-plane and y-plane of the pattern. As another example, the patterns could involve individual shapes with sizes that contract and expand as the distance between the scanning device and target decreases and increases. In these approaches, the unique representation could be realized when the shapes just barely touch, but do not overlap.

The patterns can exhibit universal representations when the scanning device is at the optimal position relative to the target such that very little instruction is required in order to train an operator as to the ideal usage of the scanning device. For example, the pattern could involve basic symmetrical shapes such as a stars or circles that only appear symmetrical when the scanning device is at the optimal position relative to the target, and for which a human operator would have an intuitive understanding regarding the appropriate representation.

In specific embodiments of the invention, the distortion of the visible light patterns could indicate how the operator should adjust the position of the scanning device in order to bring it into alignment at the optimal position. In keeping with the example of a pattern of individual shapes that just barely touch when the device is at the optimal distance, the appearance of shapes with a large amount of space between them would inform an operator that they should move the scanning device away from the target. In keeping with the above example of the pattern including symmetrical shapes, warping of the symmetry along the x-direction while symmetry was presented along the y-direction could inform an operator that they need to rotate the scanning device about the y-axis.

In specific embodiments of the invention, a device is disclosed. The device comprises a body, at least one sensor fixed to the body, and at least two light sources. The sensor can have an optimal front focal distance and an optimal orientation. As used herein, the terms "optimal front focal distance" and "optimal orientation" refer, respectively, to: (i) the distance from the sensor to a target which maximizes the sensitivity and accuracy of the sensor to that target with all else held equal; and (ii) the orientation of the sensor relative to a target surface of the target which maximizes the sensitivity and accuracy of the sensor to the target with all else held equal. In specific embodiments of the invention, the optimal orientation is achieved when a scanning surface of the scanning device is orthogonal to a target surface of the target. The at least two light sources can be aligned with the sensor and fixed to the body. The at least two light sources can include: (i) a first light source that defines a first visible light pattern; and (ii) a second light source that defines a second visible light pattern.

In specific embodiments of the invention, the way the visible light patterns appear when projected, both individually and in combination, can serve to guide a user to place the scanner at the optimal position such that the target is at the optimal orientation relative to the sensor and at the optimal front focal distance from the sensor. The light sources and sensors can be fixed to the body in such a way as to assure this relationship between the pattern of the projected light guides and the optimal positioning of the sensors relative to a target. In specific embodiments of the invention, the first visible light pattern and the second visible light pattern are each symmetrical when projected at a target surface that is at the optimal orientation relative to the sensor; while the first visible light pattern and the second visible light pattern touch, but do not overlap, when projected at a target that is at the optimal front focal distance from the sensor. In specific embodiments of the invention, the first visible light pattern and the second visible light pattern exhibit a unique combined representation when projected at a target that is at the optimal front focal distance from the sensor; and the first and second visible light pattern each exhibit a unique representation when the first and second visible light patterns are projected onto a target surface that is at the optimal orientation relative to the sensor.

In specific embodiments of the invention, a method of guiding an alignment of a device is disclosed. The method comprises projecting a first visible light pattern from the device, projecting a second visible light pattern from the device, and sensing using a sensor of the device. The sensor has an optimal front focal distance and an optimal orientation. the first visible light pattern exhibits a first universal representation when projected at a target that is at the optimal front focal distance from the sensor. The first and second visible light pattern exhibit a unique combined representation when projected onto the target while the sensor is at the optimal orientation to the target.

DETAILED DESCRIPTION

Specific devices and systems associated with aligning sensors to targets are disclosed herein. Devices and systems that utilize light guides for aligning sensors to target surfaces on targets are disclosed herein. The methods and systems disclosed in this section are nonlimiting embodiments of the invention, are provided for explanatory purposes only, and should not be used to constrict the full scope of the invention. Throughout this disclosure, the example of a hand-held scanning device used for security purpose will be used to describe the operation and benefits of certain devices and methods disclosed herein. For example, a passive millimeter wave body scanner with an optimal forward focal distance of 2.5-3.5 inches and an optimal orientation met by placing the scanning surface normal to the target surface is used as an example scanning device. However, this disclosure is broadly applicable to the alignment of any sensor whose orientation and position relative to a target effects the sensing capabilities of the sensor.

In specific embodiments of the invention, a scanning device is equipped with light guides in the form of at least two light sources that each produce a visible light pattern. The light sources can be aligned relative to one or more sensors in the scanning device and configured such that the patterns provide a visible indicator to the operator in order to guide them towards aligning the device such that the one or more sensors are located at the optimal front focal distance from the target and at the optimal orientation relative to the target surface. In specific embodiments of the invention, the patterns are universal such that operators can intuitively identify when the device is in alignment with the target. In specific embodiments of the invention, distortions in the pattern guide the operator by indicating what change in orientation or distance is required to bring the device into alignment. Accordingly, in specific embodiments of the invention, training an operator how to optimally align the device becomes nearly trivial.

Figure 1:
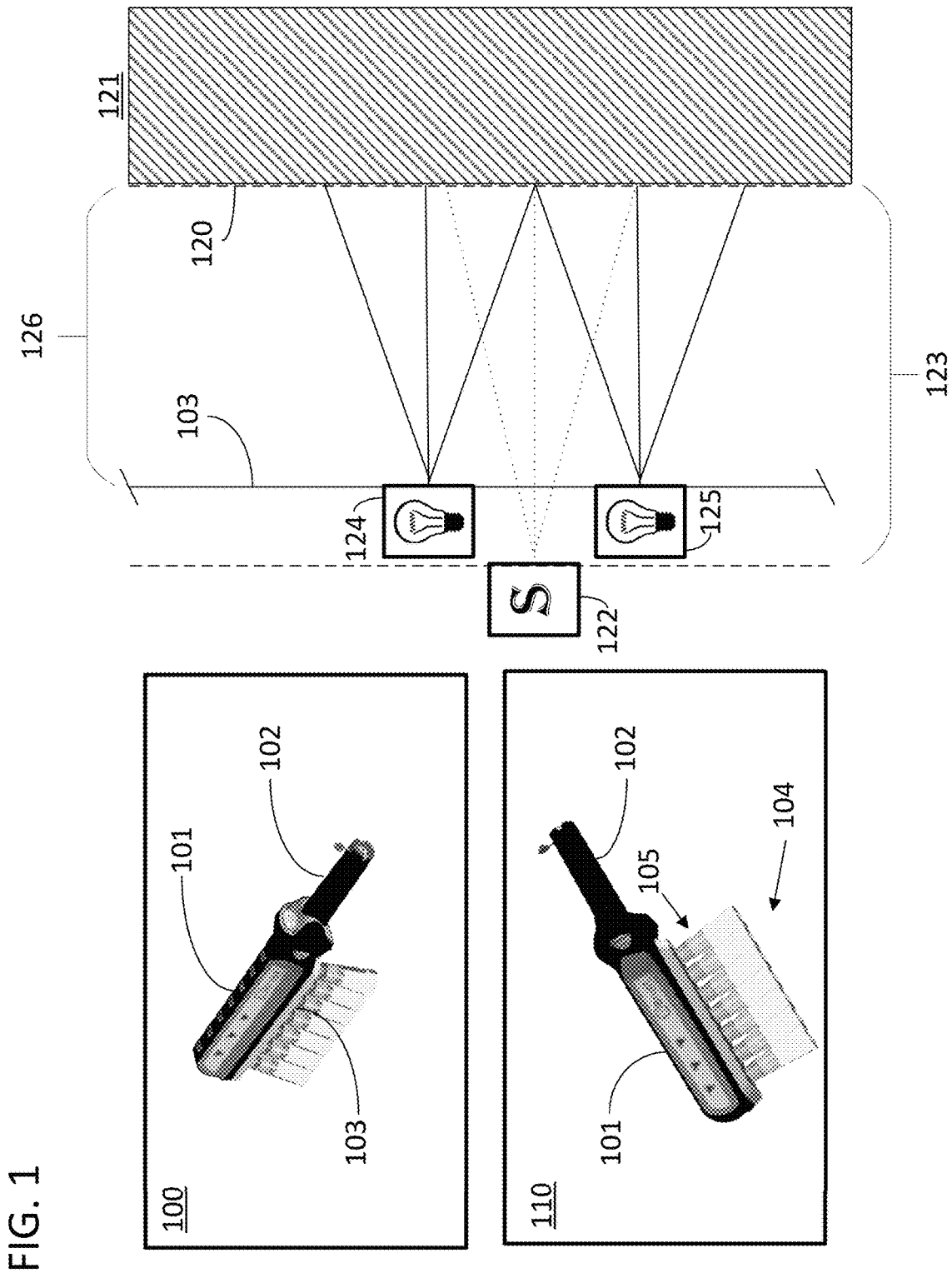
FIG. 1 illustrates the relationship of a set of light guides with a scanning device and a target surface in accordance with specific embodiments of the invention disclosed herein.

FIG. 1 provides two views of an example scanning device which utilizes light guides that are in accordance with specific embodiments of the invention disclosed herein. The scanning device in this case is a hand-held passive millimeter wave body scanner used for security purposes. The device is shown in a back-perspective view 100 and a side view 110. Both views show body 101, which includes handle 102. An operator can hold the device using handle 102 and direct scanning surface 103 towards a target in order to conduct a scan. Body 101 includes sensors that are located internally and fixed relative to body 101. The sensors are aligned, such that they all share an optimal orientation, and are configured to scan target surfaces that are orthogonal to scanning surface 103. In the illustrated case, body 101 includes seven light sources that individually project patterns of visible light from scanning surface 103. The patterns are conical projections 104 extending from the scanning surface 103. The sensors also share an optimal front focal distance indicated by region 105, which in this case is on the order of 2.5-3.5 inches. Those of ordinary skill should appreciate that the term "optimal" is used herein to refer to a range of positions in which a device is able to perform within a degree of expected sensitivity.

FIG. 1 also provides a diagram of the relationship of a scanning surface 103 of a scanning device and a target surface 120 of a target 121. The illustration shows the device placed at the optimal position in that scanning surface 103 is oriented orthogonally to target surface 120 and the distance between sensor 122 and target 121 is equal to the optimal forward focal distance 123 of sensor 122. The scanning surface 103 of the scanning device may be offset from the focal point of the sensors, such as sensor 122. This can occur because, for example, the sensors are internal to body 101. Therefore, front focal distance 123 cannot always be measured from the scanning surface of the device, and instead should be measured, as illustrated, from sensor 122 to target surface 120.

FIG. 1 also illustrates the relationship of two light guides to the sensor and the scanning surface 103. The light guides are formed by light sources 124 and 125 which are fixed to the body of the scanning device and are aligned and positioned relative to sensor 122 such that the pattern produced by the light guides is indicative of the position of the sensors. When the patterns are projected at a distance 126 with the scanning surface 103 orthogonal to target surface 120, the patterns produce unique representations that indicate the device is aligned and optimally positioned. The device is designed such that the light sources produce this pattern at distance 126, with the distance 123 as a design constraint set by the design of the sensor 122.

The light guides used in accordance with various embodiments of the present invention can take on various forms. The light guides will generally include a light source and a means of generating a visible light pattern therefrom. The light guides can involve light generated by any light source such as a laser, light emitting diode (LED), fluorescent light, or incandescent light. The light guides can include specially shaped apertures in the surface of the scanning device. Multiple apertures can project light from a single light source (e.g., two apertures may project light from a single LED). However, the apertures can also project light from separate light sources such that each aperture emits light from a single light source. The light guides can include lenses to aid in producing a desired pattern. For example, the lens could be an aspheric lens. The light guides could be lasers designed to project the outline of a circle or other shape. The rays of the laser could be angled outward from the center of the light guide such that the diameter of the circle, or surface area of the shape, increased with distance from the device. The rays of the laser could be angled inward towards the center of the light guide such that the shape turned into a point at a given distance from the device and then expanded as the device was moved further away from, or closer to, the target surface. The light guides could be LEDs designed to project a conical or cylindrical beam of light from the device with a cross section that increased with distance from the device.

Figure 2:
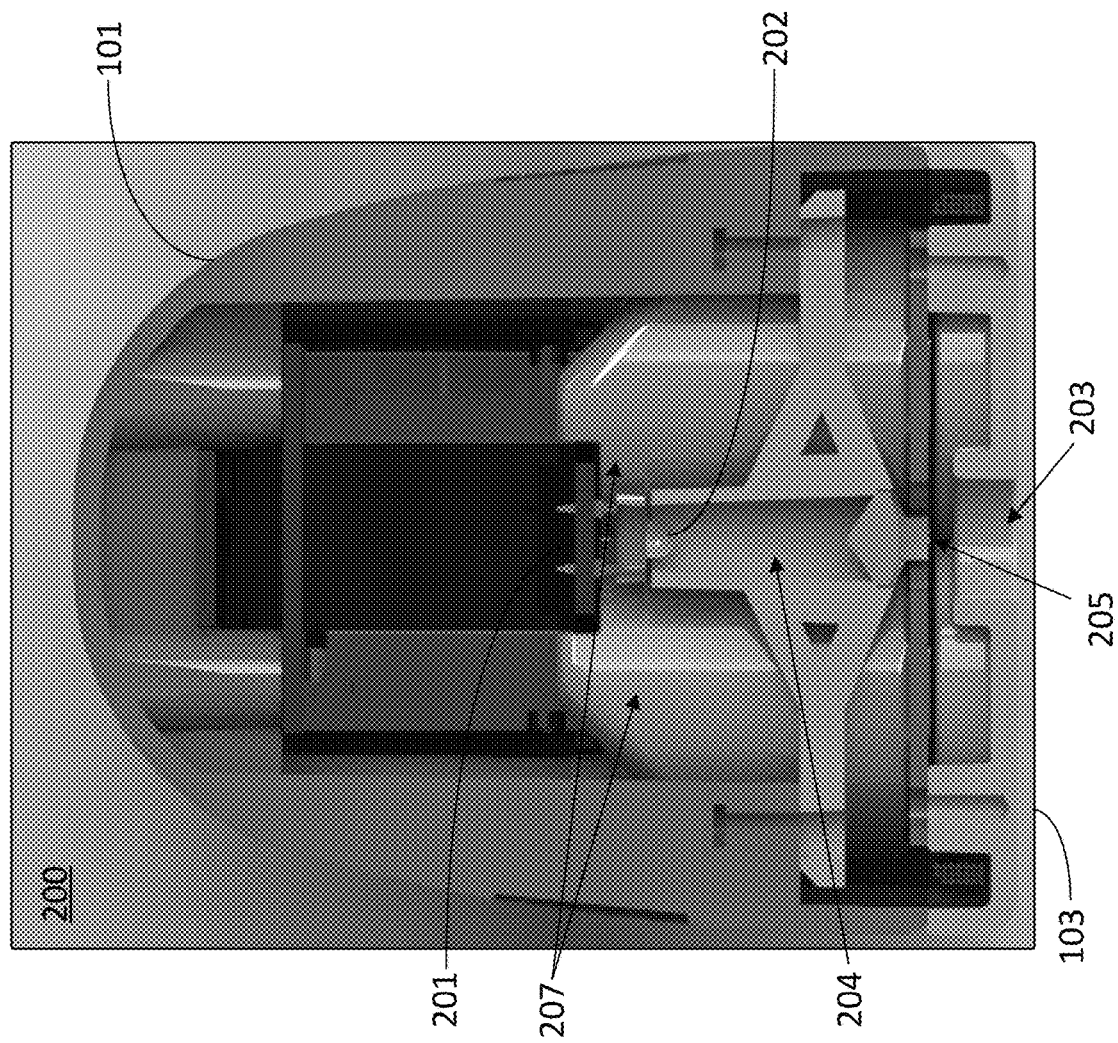
FIG. 2 illustrates a cross section of a scanning device with an internal light source in the form of a light emitting diode (LED) in accordance with specific embodiments of the invention disclosed herein.

FIG. 2 illustrates a cross section 200 of the body 101 of the hand-held body scanner from FIG. 1. The cross section illustrates the generation of a light guide in accordance with specific embodiments of the present invention. In the illustrated case, a printed circuit board (PCB) 201 is located at the center of the body 101. The PCB 201 includes a mounted LED 202 which is configured to emit light out of an aperture 203 in scanning surface 103. The LED 202 is separated from the aperture 203 by a barrel 204. The aperture is covered by a lens 205 which can be laser welded to the edge of aperture 203. The lens can be an aspheric lens. The dimensions of the barrel 204 and characteristics of the lens 205 can be selected to set the distance at which a pattern produced by the light guide exhibits the unique representation or representation, either alone or with another guide, which is associated with the scanning device being in the optimal physical position relative to the target. In FIG. 2, the sensors are represented by ray chambers 207 which block interference from millimeter wave energy from sources besides the scanned surface.

The sensors and lights sources can be fixed to the body of the scanning device in various configurations relative to each other in accordance with specific embodiments of the present invention. The sensors can be arranged in a sensor array with regular spacing along the scanning surface of the scanning device. The light sources can be interspersed among the sensors. In specific embodiments, the spacing between apertures is minimized in order to minimize the effect of variations in the target surface (i.e., the light guides are projected at approximately the same distances as the distance-to-target of the sensor regardless of irregularities in the target surface). In specific embodiments of the invention, the scanning device can have a substantially planar scanning surface. The sensors can have an optimal orientation that is orthogonal to the scanning surface. The light guides can be configured to be project in a direction that is symmetrical to a normal vector of the scanning surface. The pattern or patterns produced by the light guides can likewise by designed to be symmetrical when projected onto a target surface that is orthogonal to the scanning surface. In specific embodiments of the invention, an array of sensors will have an optimal orientation relative to the target and have a fixed orientation relative to the scanning surface such as by being orthogonal to the scanning surface. The apertures, and any lenses, associated with the light guides can be configured to project a unique representation when projected at a target surface such that the distance from the sensor to the target surface equals the optimal front focal distance of the scanner.

Figure 3:
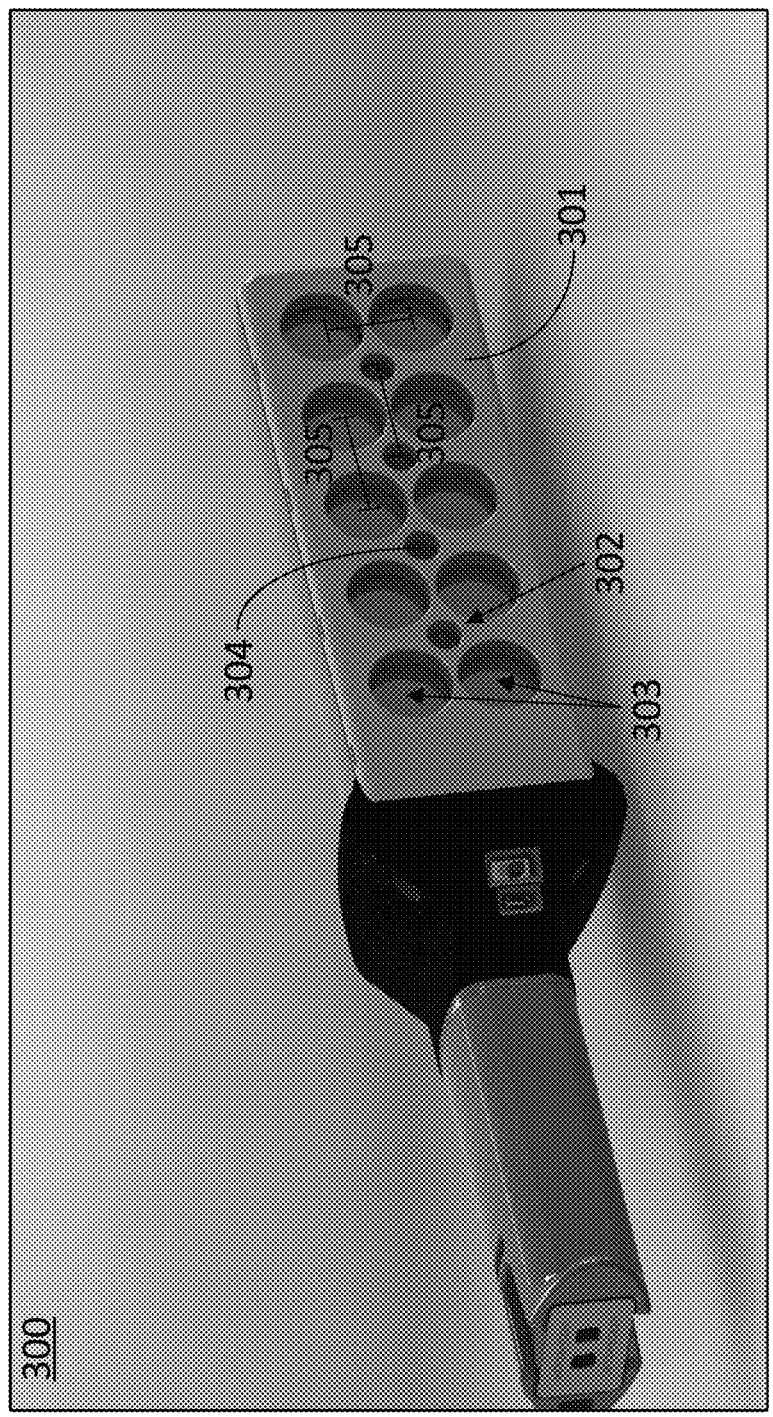
FIG. 3 illustrates a scanning surface of a scanning device in accordance with specific embodiments of the invention disclosed herein.

FIG. 3 illustrates a specific embodiment of the invention in which a hand-held millimeter wave scanning device 300 includes a scanning surface 301. The scanning surface 301 includes various apertures in the form of sensor apertures 302 and light source apertures 303. The light source apertures 303 are aligned with the sensors and interspersed therebetween. In the illustrated case, the sensor apertures 302 are covered by plastic that is transparent to millimeter wave radiation while the light source apertures 303 are covered by the lenses, such as lens 304. The millimeter wave sensors are spaced 1.5 inches apart in both the x and y directions on the scanning surface plane as indicated by dimension 305. The light source center hole distance is likewise 1.5 inches as indicated by dimension 305. The light sources are configured to project light in a direction parallel to a normal vector of scanning surface 301.

In specific embodiments of the invention, the patterns projected by the light guides can take on various forms. The patterns can exhibit different representations in order to indicate to an operator whether the device is at an optimal orientation relative to a target surface, at an optimal distance relative to the target, or both. The representations can also indicate to the operator what adjustment is required in order to bring the scanning device towards the optimal position and alignment with the target. A single light guide can project a single pattern that exhibits a representation used to indicate optimal orientation or optimal distance. Two or more light guides can project multiple patterns that exhibit a combined representation used to indicate optimal orientation and/or optimal distance. A single light guide can project a pattern that independently exhibits a representation for optimal orientation or optimal distance, and that operates in combination with a pattern from one or more other light guides to exhibit a combined representation for optimal orientation or optimal distance.

In specific embodiments of the invention, the patterns generated by the one or more light guides can independently indicate the status of the orientation to the target while the patterns combine to indicate the status of the distance to the target. In specific embodiments of the invention, the patterns can independently indicate the status of the distance to the target while the patterns can combine to indicate the status of the origination to the target. The patterns projected by the light guides can warp in such a way that they indicate the direction in which the distance or orientation should be modified to bring the device into optimal alignment. As such, the light guides can each emit the same pattern, and all provide the same information independently, while still combining to provide additional information. If all the light guides are aligned with a single scanning plane, each of the patterns can independently inform the user regarding the orientation of the scanning surface relative to a target surface.

Optimal position can be indicated by a unique representation that can not be exhibited by a light guide, or group of light guides, unless the device is in that optimal position. Furthermore, the unique representation can be a universal symbol such that an operator can intuitively determine when they are guiding the device towards the optimal position. The unique representation can be symmetrical in the x and y directions in order to guide alignment as to orientation in the x and y directions. In specific embodiments of the invention, the pattern emitted by a light guide will by a pattern that has symmetry around the x-axis, y-axis, or both axes when projected at a scanning surface that is orthogonal to the surface from which the light pattern is emitted. The light guide could, for example, generate a circle or "X" pattern which is symmetrical in both the x and y directions. Distortions in the symmetry of the projected pattern could thereby indicate which direction the device should be tilted in order to drive the system back to proper orientation as evidenced by the pattern returning to a state of symmetry. In these situations, each visible light pattern could exhibit a unique representation in the form of a natural symmetrical shape which an operator would be able to recognize and correct for.

In specific embodiments, the orientation is indicated by individual patterns while the distance is indicated by the combination of individual patterns. For example, the first visible light pattern and the second visible light pattern could exhibit a unique combined representation when projected at a target that is at the optimal front focal distance from the sensor and could each independently exhibit a first unique representation and second unique representation when projected onto a target surface that is at the optimal orientation relative to the sensor. The first and second "unique" representations could be unique in that the associated light source only exhibits that representations when it is indicating optimal alignment. However, the two representations could at the same time be identical and not unique in the sense of not being like other representations generated by other light sources on the same device. As another example, a first visible light pattern and second visible light pattern could each be symmetrical when projected at a target surface that is at the optimal orientation relative to the sensor, while the first visible light pattern and the second visible light pattern could touch, but do not overlap, when projected at a target that is at the optimal front focal distance from the sensor.

Figure 4:
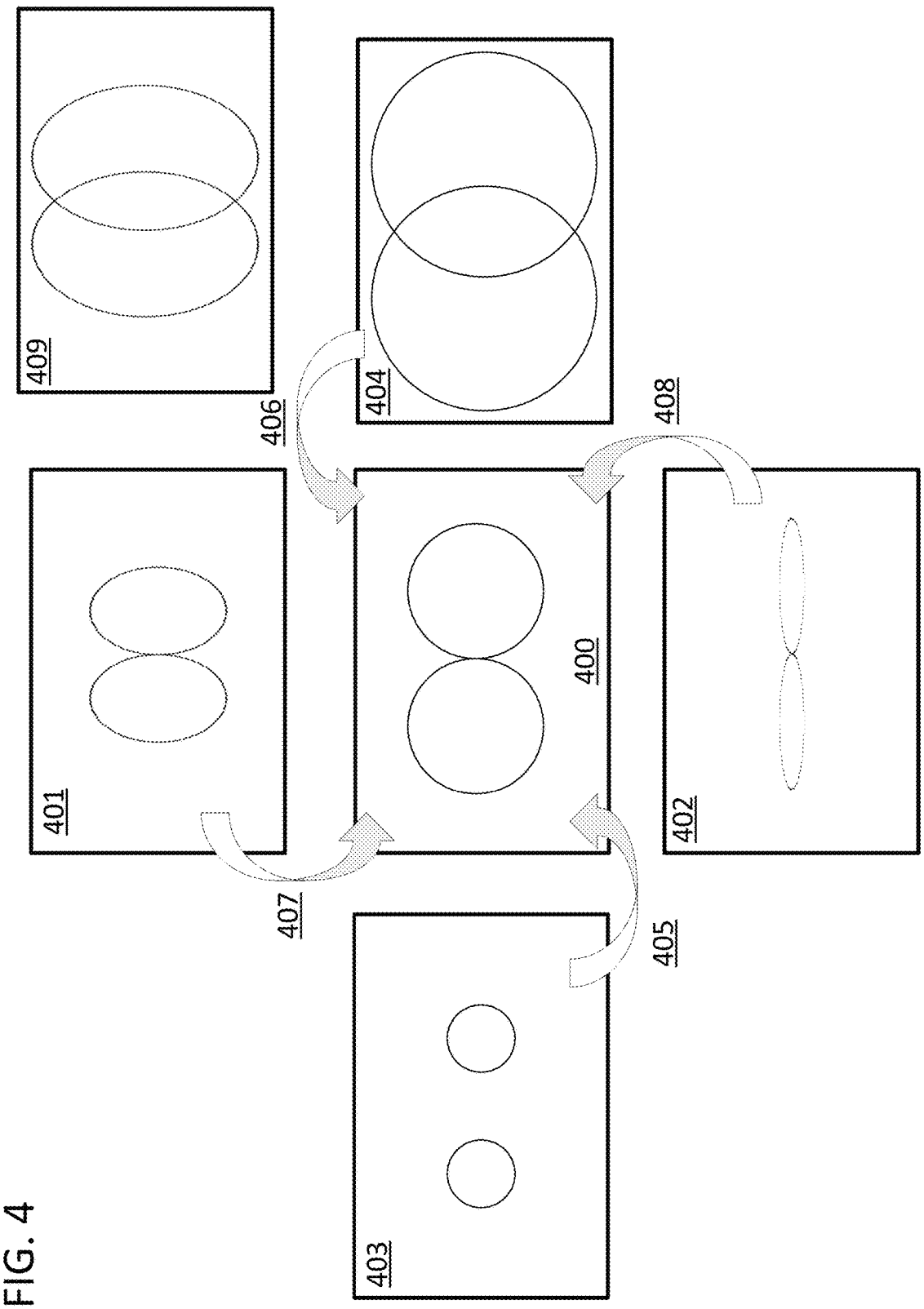
FIG. 4 illustrates a set of representations that can be produced by two light guides where the unique representation indicating an optimal position of the scanning device with those two light guides is a set of circles that touch but do not overlap in accordance with specific embodiments of the invention disclosed herein.

FIG. 4 provides a specific example of how two light guides can be used to indicate to an operator how to properly align a scanning device in terms of both optimal orientation and optimal forward focal distance. Each of the representations 400, 401, 402, 403, and 404 are exhibited by the same two light guides from a single scanning device. The representations only differ in that those two light guides are being projected at a target surface under different conditions—namely different relative positions of the scanning device to that target surface. The two light guides could be two of many light guides on the scanning device, such as the four light guides represented by the light guide apertures in FIG. 3. However, two light guides are being used in this example for simplicity.

The two light guides in the example of FIG. 4 indicate an optimal position for the scanning device in unique representation 400. The light guides in this example can be conical light guides produced by two spaced apart light sources projecting light outward from the scanning surface of the scanning device. The conical light guides can each individually guide the operator towards positioning the scanning device at the optimal orientation and can simultaneously act in combination to guide the operator towards positioning the scanning device at the optimal distance from the target surface as will be described below.

Representation 400 is a combined representation in that each circle in the representation is produced by a single light guide. Representation 400 is a unique representation because the two circles touch, but do not overlap. As such, unique representation 400 indicates to an operator that the device is at the optimal distance from the scanning surface. If instead, the combined representation exhibited representation 403, the operator would know that the scanning device was too close to the scanning surface. The operator would then be able to enact transition 405 by moving the device away from the target surface. In a similar fashion, if instead, the combined representation exhibited representation 404, the operator would know that the scanning device was too far from the scanning surface. The operator would then be able to enact transition 406 to move the device towards the target surface while maintaining the orientation relative to the target surface.

Representation 400 also includes two independent representations in that each circle can be considered by itself. Each circle is a unique representation because it exhibits symmetry and would not if the device was positioned off the optimal orientation. As such, each circle in representation 400 indicates to an operator that the device is at the optimal orientation relative to the target surface. If instead, the light guides exhibited the representations present in representation 401, the operator would know that the scanning device was misaligned due to a rotation around the y-axis. The operator would then be able to enact transition 407 by rotating the device back in the opposite direction around y-axis. In a similar fashion, if instead, either light guide exhibited the representations present in representation 402, the operator would know that the scanning device was misaligned due to a rotation along the x-axis. The operator would then be able to enact transition 408 to rotate the device back in the opposite direction around the x-axis.

There are any number of combinations of the misalignments represented by representations 401, 402, 403, and 404 that can be corrected intuitively by an operator using these same concepts, but where both the independent and combined representations are considered and used to correct for the separable components of the alignment. Representation 409 is provided as one example in which the light guides would inform an operator that the device was misalignment with the errors associated with both representation 401 and 404. In response to representation 409, the operator could combine transitions 406 and 407 in one motion to bring the scanning device into alignment.

Figure 5:
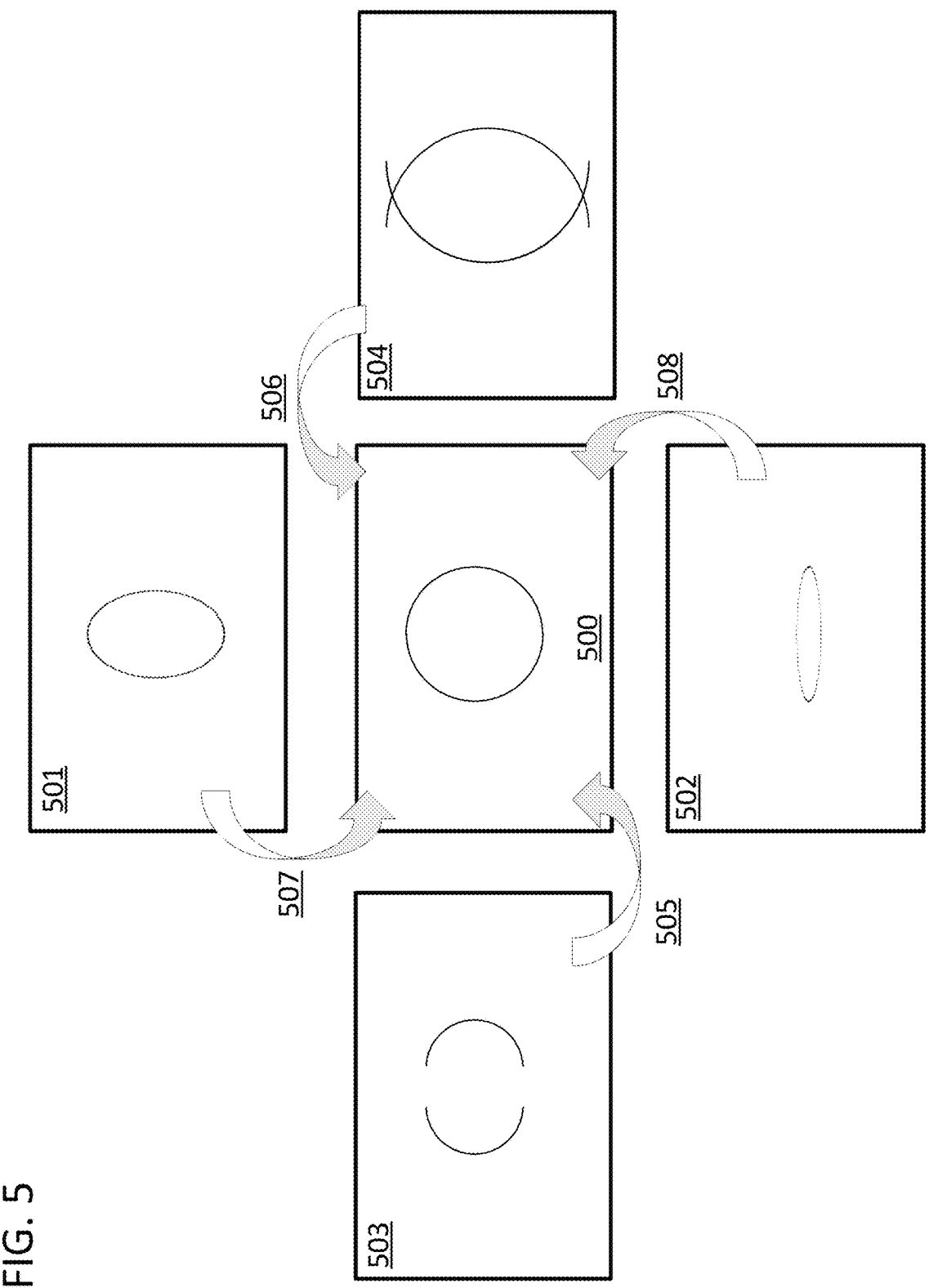
FIG. 5 illustrates a set of representations that can be produced by two light guides where the unique representation indicating an optimal position of the scanning device with those two light guides is a circle in accordance with specific embodiments of the invention disclosed herein.

FIG. 5 provides a specific example of how two light guides can be used to indicate to an operator how to properly align a scanning device in terms of both optimal orientation and optimal forward focal distance. Each of the representations 500, 501, 502, 503, and 504 are exhibited by the same two light guides from a single scanning device. The representations only differ in that those two light guides are being projected at a target surface under different conditions—namely different relative positions of the scanning device to that target surface. The two light guides could be two of many light guides on the scanning device.

The two light guides in the example of FIG. 5 indicate an optimal position for the scanning device in unique representation 500. The light guides in this example can be segmented conical light guides produced by two spaced apart light sources projecting light outward from the scanning surface of the scanning device through an aperture designed to segment the cone of light in half. The segmented conical light guides can each individually guide the operator towards positioning the scanning device at the optimal orientation and can simultaneously act in combination to guide the operator towards positioning the scanning device at the optimal distance from the target surface as will be described below.

Representation 500 is a combined representation in that the in the representation is produced by two light guides in combination. Representation 500 is a unique representation because the halves of the circle are connected, but do not overlap. As such, unique representation 500 indicates to an operator that the device is at the optimal distance from the scanning surface. If instead, the combined representation exhibited representation 503, the operator would know that the scanning device was too close to the scanning surface. The operator would then be able to enact transition 505 by moving the device away from the target surface. In a similar fashion, if instead, the combined representation exhibited representation 504, the operator would know that the scanning device was too far from the scanning surface. The operator would then be able to enact transition 506 to move the device towards the target surface while maintaining the orientation relative to the target surface.

Representation 500 also includes two independent representations in that each half of the circle can be considered by itself. Each half circle is a unique representation because it exhibits symmetry and would not if the device was positioned off the optimal orientation. As such, each half circle in representation 500 indicates to an operator that the device is at the optimal orientation relative to the target surface. If instead, either light guide exhibited the representations present in representation 501, the operator would know that the scanning device was misaligned due to a rotation around the y-axis. The operator would then be able to enact transition 507 by rotating the device back in the opposite direction around y-axis. In a similar fashion, if instead, either light guide exhibited the representations present in representation 502, the operator would know that the scanning device was misaligned due to a rotation along the x-axis. The operator would then be able to enact transition 508 to rotate the device back in the opposite direction around the x-axis.

In specific examples, the one or more patterns generated by the light guides will also exhibit asymmetry in the z-axis direction such that a user can independently determine if the proper orientation has been reached in the z-direction. For example, an arrow on the pattern pointing up could be utilized to assure that the scanners were aligned in the z-direction also.

Figure 6:
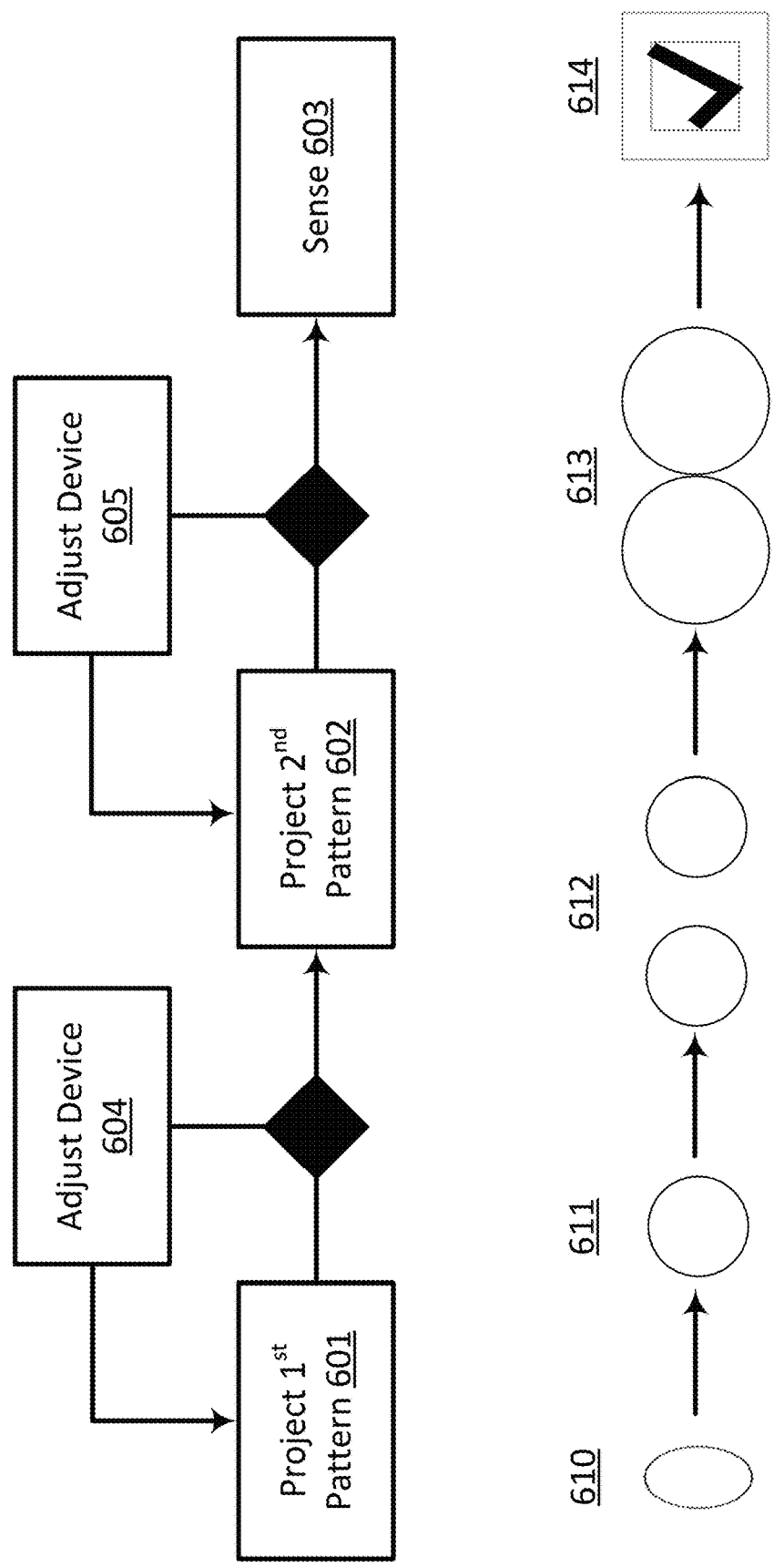
FIG. 6 illustrates a flow chart for a set of methods for aligning a scanning device with a target that are in accordance with specific embodiments of the invention disclosed herein.

FIG. 6 illustrates a flow chart 600 for a set of methods for guiding an alignment of a scanning device. In step 601 a first visible light pattern is projected from the scanning device to a target surface. In step 602 a second visible light pattern is projected from the device. The steps could be conducted simultaneously. They are presented in sequence in this flow chart because the patterns can be independently evaluated. For example, the first pattern could be initially projected to form representation 610. An operator could then evaluate representation 610, notice that it is distorted from the expected unique representation of a perfect circle, and adjust the position of the device in a step 604. Step 601 could also be continuously conducted so that the operator could continuously evaluate the projected representation and stop the adjustment when the first pattern adopted representation 611.

In specific embodiments of the invention, the light guides can periodically or continuously produce a visible light pattern. For example, the light guides could project a pattern only when a motion sensor located on the device detected that the device was moving, only when a user pressed a trigger or button to initiate a scan, in a strobing fashion based on an internal timer, or continuously. If the device was configured to generate multiple patterns, the patterns could be alternatively displayed in a given sequence. The patterns could also be displayed based on the type of alignment an operator was currently conducting. For example, the light guides could have two modes that the operator could alternatively initiate in which different patterns were displayed to first guide optimal orientation alignment and then to guide optimal distance alignment. Accordingly, steps 601 and 602 can be conducted simultaneously or in sequence.

In FIG. 6, the pattern projected in step 602 could be continuously projected along with the pattern projected in step 601, or the pattern could be projected after the pattern in step 601 had been projected. As illustrated, the second pattern projected in step 602 could be projected to form half of representation 612 in the form of another, equally sized circle, projected on a target surface. An operator could then evaluate representation 612, notice that is distorted from an expected unique representation of a set of circles that touch but do not overlap, and adjust the position of the device in a step 605. Step 602 could also be continuously conducted so that the operator could continuously evaluate the projected representation and stop the adjustment when the second pattern adopted representation 613. The execution of the control loop including steps 605 and 602 would then assure that the device was located such as to place the sensor at the optimal forward focal distance from the target.

In step 603, the sensor is used to scan the target. The execution of the control loops including steps 605 and 602, and steps 601 and 604 would assure that the device was in the optimal position for conducting a scan on the target. Step 603 can be conducted after the optimal orientation of the device relative to a target surface has been verified visually 614 by the operator. The operator could be trained to initiate a scan operation after verification. Alternatively, the sensing operation could be continuous, and verification 614 would involve the operator merely having confidence that the scan of a specific portion of the target was completed. As such, step 603 could involve the operator holding the scanning device stationary for a given amount of time or sweeping the scanner over a given area with the knowledge that the area had been successfully scanned.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to hand-held scanners and visible light patterns, the same approaches could be applied to any kind of scanning device that needs to be placed in a desired position relative to a target and to patterns produced via any form of light or electromagnetic energy. For example, the patterns could be produced by ultraviolet light and the operators could be equipped with special eyewear for detecting ultraviolet light. The operators also do not have to be human and can be robotic systems capable of repositioning the scanning device in response to the patterns projected onto the target. Furthermore, in the case of scanning devices that utilize an active projection of electromagnetic energy, the pattern can be produced using the same energy so long as the control loop could those patterns. In specific applications, the pattern can be projected as a byproduct of the active sensing such that dedicated light guides are not required to be added to the scanning device. These and other modifications and variations to the present invention may be practiced by those skilled in the art, without departing from the scope of the present invention, which is more particularly set forth in the appended claims.

What is claimed is:

1. A device comprising:
a body;
a sensor fixed to the body and having: (i) an optimal front focal distance; and (ii) an optimal orientation;
at least two light sources, aligned with the sensor and fixed to the body, including: (i) a first light source that defines a first visible light pattern; and (ii) a second light source that defines a second visible light pattern;
wherein the first visible light pattern and the second visible light pattern touch, but do not overlap, when projected at a target that is at the optimal front focal distance from the sensor; and
wherein the first visible light pattern and the second visible light pattern are each symmetrical when projected at a target surface that is at the optimal orientation relative to the sensor.

2. The device of claim 1, wherein:
the body includes a handle; and
the device is a hand-held scanner.

3. The device of claim 2, wherein:
the sensor is a passive millimeter wave sensor; and
the device is a hand-held passive millimeter wave scanner.

4. The device of claim 2, further comprising:
a scanning surface;
wherein the first visible light pattern and the second visible light pattern are both emitted from the scanning surface; and
wherein the target surface is at the optimal orientation relative to the sensor when the scanning surface is orthogonal to the target surface.

5. The device of claim 4, further comprising:
an array of aligned sensors, wherein the sensor is part of the array of sensors;
wherein at least two light sources are aligned with the array of aligned sensors; and
wherein the at least two light sources are interspersed between the sensors in the array of sensors.

6. The device of claim 1, wherein:
the first and second visible light pattern are each circles when projected at the target surface that is at the optimal orientation relative to the sensor.

7. The device of claim 1, wherein:
the first visible light pattern and the second visible light pattern do not touch when projected at a distance less than the optimal front focal distance; and
the first visible light pattern and the second visible light pattern overlap when projected at a distance greater than the optimal front focal distance.

8. The device of claim 1, further comprising:
a first lens, fixed to the body, which defines the first visible light pattern in combination with the first light source; and
a second lens, fixed to the body, which defines the second visible light pattern in combination with the second light source.

9. A device comprising:
a body;
a sensor fixed to the body and having: (i) an optimal front focal distance; and (ii) an optimal orientation;
at least two apertures, aligned with the sensor, including: (i) a first aperture that defines a first visible light pattern; and (ii) a second aperture that defines a second visible light pattern;
wherein the first visible light pattern and the second visible light pattern exhibit a unique combined representation when projected at a target that is at the optimal front focal distance from the sensor;
wherein the first visible light pattern exhibits a first unique representation and the second visible light pattern exhibits a second unique representation; when the first visible light pattern and the second visible light pattern are projected onto a target surface that is at the optimal orientation relative to the sensor.

10. The device of claim 9, wherein:
the body includes a handle; and
the device is a hand-held scanner.

11. The device of claim 10, wherein:
the sensor is a passive millimeter wave sensor; and
the device is a hand-held passive millimeter wave scanner.

12. The device of claim 10, further comprising:
a scanning surface;
wherein the first visible light pattern and the second visible light pattern are both emitted from the scanning surface; and
wherein the target surface is at the optimal orientation relative to the sensor when the scanning surface is orthogonal to the target surface.

13. The device of claim 12, further comprising:
an array of aligned sensors, wherein the sensor is part of the array of sensors;
wherein the at least two apertures include at least four apertures; and
wherein at least two apertures are interspersed between the sensors in the array of sensors.

14. The device of claim 9, wherein:
the first and second visible light pattern are each circles when projected at the target surface that is at the optimal orientation relative to the sensor.

15. The device of claim 9, wherein:
the first visible light pattern and the second visible light pattern do not touch when projected at a distance less than the optimal focal distance; and
the first visible light pattern and the second visible light pattern overlap when projected at a distance greater than the optimal focal distance.

16. The device of claim 9, further comprising:
a first lens, fixed to the body, which defines the first visible light pattern in combination with the first aperture; and
a second lens, fixed to the body, which defines the second visible light pattern in combination with the second aperture.

17. A method of guiding an alignment of a device comprising:
projecting a first visible light pattern from the device;
projecting a second visible light pattern from the device;
sensing using a sensor of the device, wherein the sensor has: (i) an optimal front focal distance; and (ii) an optimal orientation;
wherein the first visible light pattern exhibits a first universal representation when projected at a target that is at the optimal front focal distance from the sensor; and
wherein the first and second visible light pattern exhibit a unique combined representation when projected onto the target while the sensor is at the optimal orientation to the target.

18. The method of claim 17, wherein:
the sensor is a passive millimeter wave sensor; and
the device is a hand-held passive millimeter wave scanner.

19. The method of claim 17, wherein:
the device has a scanning surface;
the first visible light pattern and the second visible light pattern are both emitted from the scanning surface;
the target has a target surface; and
the target surface is at the optimal orientation relative to the sensor when the scanning surface is orthogonal to the target surface.

20. The method of claim 19, wherein:
the device includes an array of aligned sensors;
the sensor is part of the array of sensors; and
the device includes at least four apertures interspersed between the sensors in the array of sensors.

21. The method of claim 17, wherein:
the first universal representations is a circle; and
the combined unique representation comprises two circles that: (i) touch; but (ii) do not overlap.

\* \* \* \* \*